(12) United States Patent
Bowness et al.

(10) Patent No.: US 9,071,424 B1
(45) Date of Patent: Jun. 30, 2015

(54) TOKEN-BASED KEY GENERATION

(71) Applicant: EMC Corporation, Hopkinton, MA (US)

(72) Inventors: Piers Bowness, Boxborough, MA (US); Paul A. Dennis, Wayland, MA (US)

(73) Assignee: EMC Corporation, Hopkinton, MA (US)

( * ) Notice: Subject to any disclaimer, the term of this patent is extended or adjusted under 35 U.S.C. 154(b) by 42 days.

(21) Appl. No.: 13/853,207

(22) Filed: Mar. 29, 2013

(51) Int. Cl.
*H04L 29/06* (2006.01)
*H04L 9/08* (2006.01)
*H04L 7/00* (2006.01)

(52) U.S. Cl.
CPC ............ *H04L 9/0838* (2013.01); *H04L 7/0012* (2013.01)

(58) Field of Classification Search
CPC .......................... H04L 96/0838; H04L 7/0012
USPC ............................................. 713/151; 380/44
See application file for complete search history.

(56) References Cited

U.S. PATENT DOCUMENTS

| | | | | |
|---|---|---|---|---|
| 5,887,065 | A * | 3/1999 | Audebert | 713/172 |
| 7,945,776 | B1 * | 5/2011 | Atzmony et al. | 713/165 |
| 8,327,422 | B1 | 12/2012 | Friedman et al. | |
| 8,412,928 | B1 | 4/2013 | Bowness | |
| 8,745,710 | B1 * | 6/2014 | Roth et al. | 726/6 |
| 8,799,641 | B1 * | 8/2014 | Seidenberg et al. | 713/153 |
| 2002/0078243 | A1 * | 6/2002 | Rich et al. | 709/248 |
| 2004/0006701 | A1 * | 1/2004 | Kresina et al. | 713/189 |
| 2005/0187873 | A1 * | 8/2005 | Labrou et al. | 705/40 |
| 2006/0256961 | A1 * | 11/2006 | Brainard et al. | 380/44 |
| 2007/0147612 | A1 * | 6/2007 | Forrest et al. | 380/255 |
| 2008/0010218 | A1 * | 1/2008 | Zank | 705/75 |
| 2009/0245516 | A1 * | 10/2009 | Ravikiran | 380/268 |
| 2010/0034383 | A1 * | 2/2010 | Turk | 380/262 |
| 2012/0151566 | A1 * | 6/2012 | Lin et al. | 726/7 |
| 2012/0263220 | A1 * | 10/2012 | Li et al. | 375/224 |
| 2012/0290840 | A1 * | 11/2012 | Willins | 713/168 |
| 2013/0251145 | A1 * | 9/2013 | Lowans et al. | 380/44 |

OTHER PUBLICATIONS

Robinson, Peter Alan, et al., "Message Bus Key Agreement Scheme", U.S. Appl. No. 13/169,179, filed Jun. 27, 2011.
Eronen, P., et al., "Pre-Shared Key Ciphersuites for Transport layer Security (TLS)", <http://tools.ietf.org/html/rfc4279>, 15 pages, Dec. 2005.

* cited by examiner

*Primary Examiner* — Michael Pyzocha
(74) *Attorney, Agent, or Firm* — BainwoodHuang

(57) ABSTRACT

One embodiment is directed to a method performed by a computing device. The method includes (a) engaging in a handshake procedure with a remote second computing device to establish a secure channel, (b) generating a first encryption key using a first token having a secret seed, the first encryption key being the same as a second encryption key generated by the second computing device using a second token having the same secret seed, and (c) using the first encryption key to engage in encrypted communications with the second computing device. Other embodiments are directed to a computerized apparatus and a computer program product for performing a method similar to that described above.

18 Claims, 3 Drawing Sheets

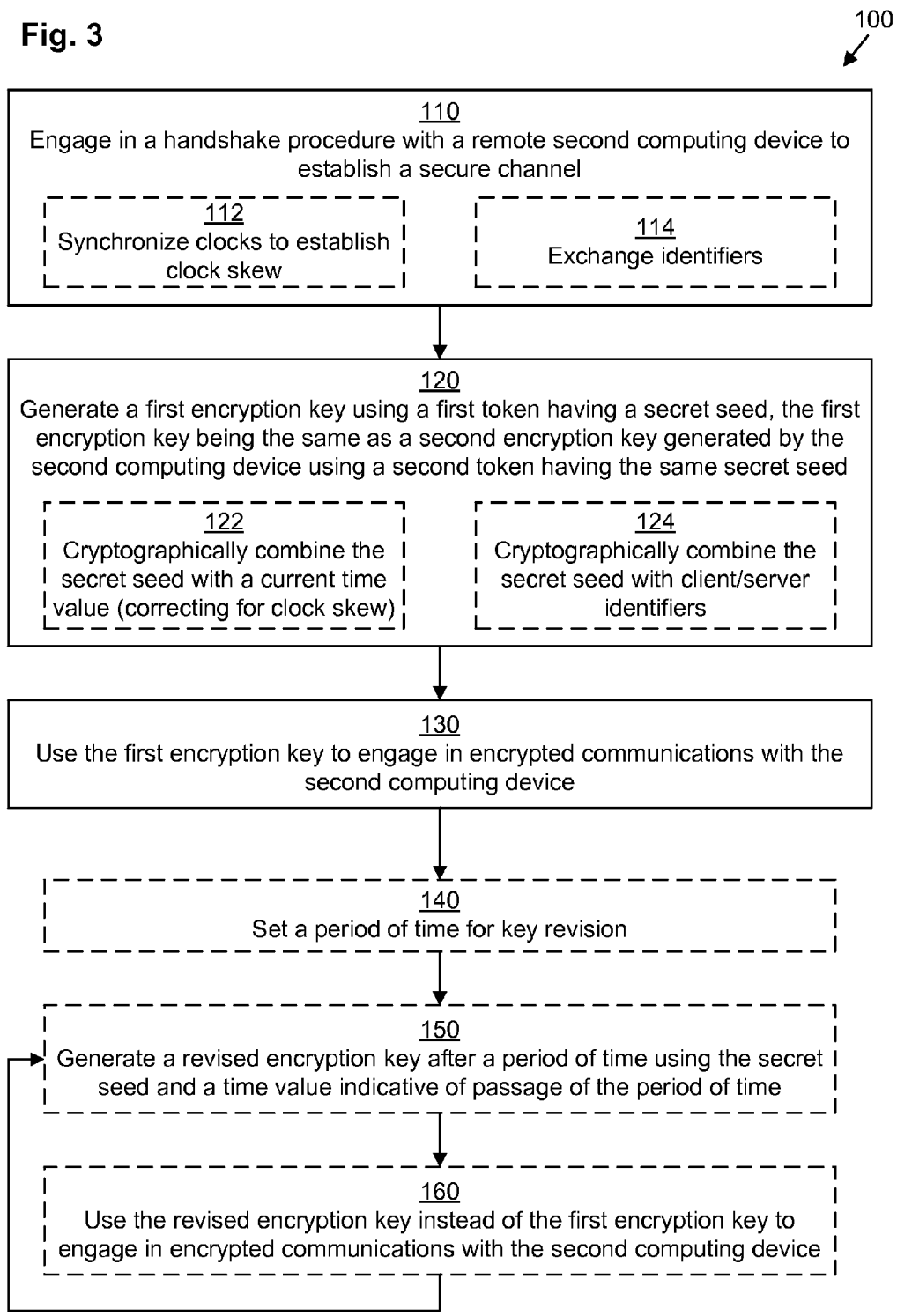

TOKEN-BASED KEY GENERATION

BACKGROUND

Often, it is desirable for two computers to securely communicate with each other over a public network. This may be accomplished using asymmetric encryption when operating within a public key infrastructure (PKI). Thus, one computer may obtain a public key for the second computer from a signed certificate provided by a certifying authority, which it may then use to encrypt a communication destined for the second computer. The second computer may also obtain a certificate for the first computer in order to communicate in the reverse direction. In some arrangements, the first computer includes a symmetric key within the original encrypted communication sent to the second computer so that symmetric encryption may subsequently be used between the computers.

In other arrangements, a pre-shared key may be used by both computers in order to engage in symmetric encryption. The pre-shared key may be initially assigned to both computers, or the pre-shared key may be communicated via an out-of-band communications channel, such as by telephone or courier.

SUMMARY

The above-described conventional approaches for allowing two computers to securely communicate with each other over a public network suffer from deficiencies. For example, the asymmetric approaches require a PKI to be in place. Furthermore, if the standard public key encryption (e.g., the RSA algorithm) is broken (e.g., by solving the prime factorization problem), then the communication channel between the two computers would no longer be secure. As an additional example, the pre-shared key approach suffers if there is no channel over which to share the key. Even if the key is shared, it may be difficult to alter the key in case the key is cracked after a period of time.

Thus, it would be desirable to devise a system in which two computers may agree upon a key without needing a PKI or an out-of-band communications channel. It would also be desirable to allow for frequent key updates. Thus, embodiments are directed to techniques for allowing two computers to both generate the same key using tokens sharing a secret seed.

One embodiment is directed to a method performed by a computing device. The method includes (a) engaging in a handshake procedure with a remote second computing device to establish a secure channel, (b) generating a first encryption key using a first token having a secret seed, the first encryption key being the same as a second encryption key generated by the second computing device using a second token having the same secret seed, and (c) using the first encryption key to engage in encrypted communications with the second computing device. Other embodiments are directed to a computerized apparatus and a computer program product for performing a method similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 depicts an example method according to various embodiments.

DETAILED DESCRIPTION

Embodiments are directed to techniques for allowing two computers to both generate the same key using tokens sharing a secret seed.

Figure 1:
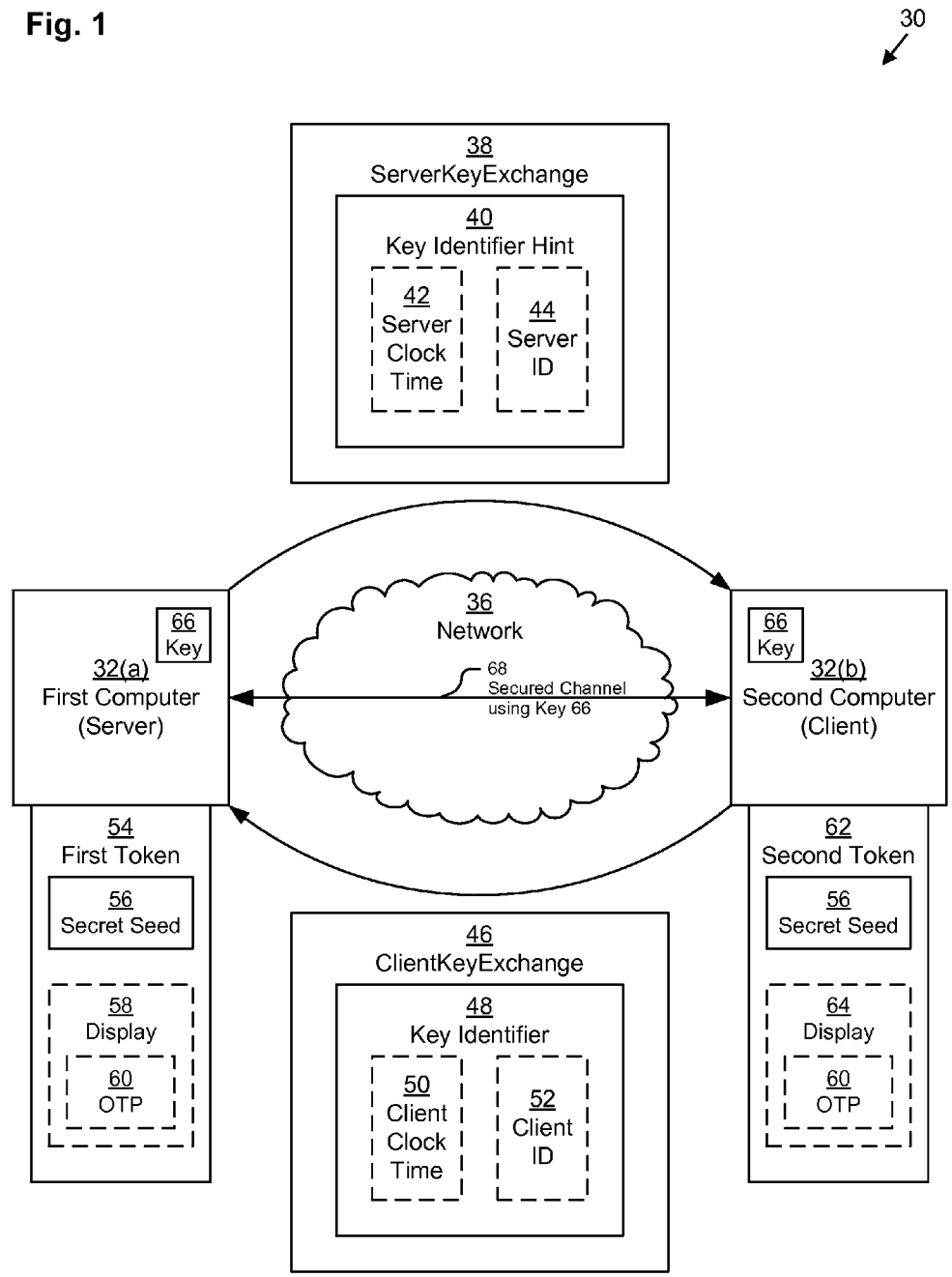
FIG. 1 depicts an example system for use in performing various embodiments.

FIG. 1 depicts an example system 30. System 30 includes a first computer 32(a) and a second computer 32(b) which may communicate with each other over network 36. Computers 32 may be any kind of computing devices such as, for example, a personal computer, a workstation, a server, an enterprise server, a laptop computer, a mobile computer, a smart phone, a tablet computer, etc. Network 36 may be any kind of network, such as, for example, a local area network, a wide area network, the Internet, a storage area network, a fabric of interconnected hubs and switches, etc. In some embodiments, in lieu of a network, direct point-to-point connections may be used.

In order for computers 32 to communicate securely over network 36, a secured channel 68 may be established. Secured channel 68 is established upon negotiation of a shared key 66 using a handshake procedure. The handshake procedure may operate, for example, according to the Transport Layer Security—Pre-Shared Key (TLS-PSK) standard as described in the document entitled "RFC 4279—Pre-Shared Key Ciphersuites for Transport Layer Security (TLS)" published by the Network Working Group of the Internet Engineering Task Force in December 2005, the contents and teachings of which are hereby fully incorporated herein by this reference.

Using a handshake in compliance with the TLS-PSK standard, second computer 32(b) may first send a Client Hello message (not depicted) to the first computer 32(a). Upon receipt, the first computer 32(a) responds with a Server Hello message (not depicted) and optionally a ServerKeyExchange message 38. ServerKeyExchange message 38 includes a key identifier hint 40. In some embodiments, key identifier hint 40 includes the current clock time of the first computer 32(a), referred to as server clock time 42, in order to allow synchronization between the two computers 32. In other embodiments, key identifier hint 40 includes a server identifier 44, while in yet other embodiments, key identifier hint 40 includes both the server clock time 40 and the server identifier 44.

In response to receiving the Server Hello message and optional ServerKeyExchange message 38, the second computer 32(b) sends ClientKeyExchange message 46 to the first computer 32(a). ClientKeyExchange message 46 includes a key identifier 48. In some embodiments, key identifier 48 includes the current clock time of the second computer 32(b), referred to as client clock time 50, in order to allow synchronization between the two computers 32. In other embodiments, key identifier 48 includes a client identifier 52, while in yet other embodiments, key identifier 48 includes both the client clock time 50 and the client identifier 52. Key identifier 48 allows the two computers 32 to both generate the same key 66 because both computers 32 are in possession of the same secret seed 56 which can be used in conjunction with the current time (skewing for any differences observed during synchronization) and/or a combination of the server ID 44 and the client ID 52 in order to cryptographically generate the key 66.

The first computer 32(*a*) is operated in conjunction with a first token 54. In some embodiments, first token 54 is a software token, while in other embodiments, first token 54 is a hardware token. If first token 54 is a hardware token (e.g., a SecurID token provided by RSA, The Security Division of EMC Corp. of Hopkinton, Mass.), it may either connect directly to the first computer 32(*a*) over a device interface or it may include a display 58 which displays a one-time passcode (OTP) 60 for the user to type into the first computer 32(*a*).

The second computer 32(*b*) is operated in conjunction with a second token 62. In some embodiments, second token 62 is a software token, while in other embodiments, second token 62 is a hardware token. If second token 62 is a hardware token (e.g., a SecurID token), it may either connect directly to the second computer 32(*b*) over a device interface or it may include a display 64 which displays a one-time passcode (OTP) 60 for the user to type into the second computer 32(*b*).

Since both computers 32 use the same secret seed 56 and additional information to cryptographically generate key 66, secured channel 68 may be established using the key 66 even though the key 66 has never been transmitted between the computers 32.

It should be understood that tokens 54 and 62 are provisioned with the same secret seed 54. In some embodiments, the tokens 54, 62 may be manufactured or programmed in pairs, so that only two tokens ever have the same seed and those two tokens 54, 62 are then distributed to pairs of computers 32(*a*), 32(*b*) that require a secured communication channel 68 therebetween.

In other embodiments, the tokens 54, 62 may be manufactured or programmed in larger groups (e.g., 20 tokens) so that many tokens under the control of a single entity (e.g., a single corporation) all have the same seed 56. Thus, several computers 32 under the control of that entity may communicate with various other computers 32 under the control of that entity.

Figure 2:
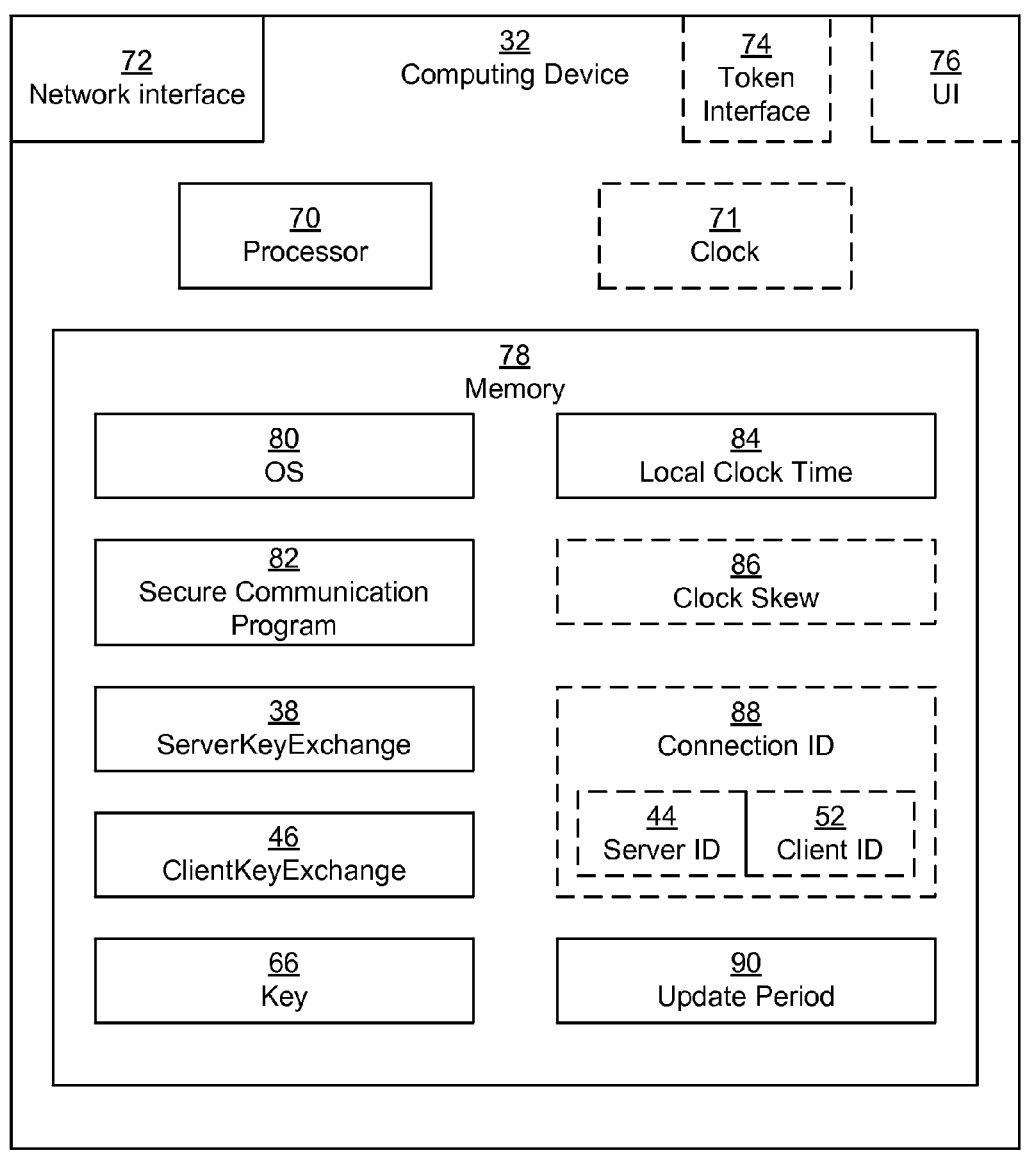
FIG. 2 depicts an example apparatus according to various embodiments.

FIG. 2 depicts an example computing device 32 in which a method is performed as described in further detail below in connection with FIG. 3. Since in some embodiments the method may be performed in first computer 32(*a*), while in other embodiments the method may be performed in second computer 32(*b*), computing device 32 may be either first computer 32(*a*) or second computer 32(*b*), depending on the embodiment.

Computing device 32 includes a processor 70. Processor 70 may be any kind of processor or set of processors configured to perform operations, such as, for example, a microprocessor, a multi-core microprocessor, a digital signal processor, a collection of electronic circuits, or any combination of the above. Computing device 32 also includes a network interface 72 for interfacing with network 36.

Computing device 32 also includes a token interface 74 for interfacing with its respective token 54, 62 or a user interface (UI) 76 for interfacing with a display and user input devices (not depicted). Token interface 74 may be, for example, a Universal Serial Bus (USB) interface or other similar interface capable of interfacing with the token 54, 62. The display device to which the UI 76 connects may be any kind of display device capable of displaying a GUI or text-based interface, such as, for example, a monitor, a television, a cathode ray tube, a liquid crystal display, a plasma display, a light emitting diode display, a touch-sensitive display screen, etc., while the user input devices may include a keyboard, mouse, keypad, trackpad, trackball, etc. Thus, UI 76 may include a graphics adapter, a USB adapter, and any other kind of adapter configured to interface with a display or user-input device.

Computing device 32 may also include a clock 71, although in some embodiments, the clock is instead embedded within the token 54, 62.

Computing device 32 also includes memory 78. Memory 78 may be any kind of digital system memory, such as, for example, RAM. Memory 78 stores programs executing on processor 70 as well as data used by those programs. Memory 70 stores an operating system (OS) 80 and a secure communication program 82, both of which run on processor 70. Memory 78 may include both a system memory portion for storing programs and data in active use by the processor 70 as well as a persistent storage portion (e.g., solid-state storage and/or disk-based storage) for storing programs and data even while the computing device 32 is powered off. OS 80 and secure communication program 82 are typically stored both in system memory and in persistent storage so that they may be loaded into system memory from persistent storage upon a system restart. Secure communication program 82, when stored in non-transient form either in system memory or in persistent storage, forms a computer program product. The processor 70 running the secure communication program 82 thus forms a specialized circuit constructed and arranged to carry out the various processes described herein.

Memory 78 also stores a local clock time 84 as read from the clock 71 and, in some embodiments, a clock skew 86, which indicates by how much time the local clock time 84 differs from the clock time on the other computing device. Memory 78 also stores the ServerKeyExchange message 38, the ClientKeyExchange message 46, and the key 66 once generated. In some embodiments, memory 78 also stores a connection ID 88 which uniquely identifies the pairing of the two computers 32 by including both the server ID 44 and the client ID 52. Finally, memory 78 also stores an update period 90, which is a period of time after which the key 66 should be updated using the local clock time 84 (and clock skew 86) as well as secret seed 56 and, in some embodiments, also the connection ID 88.

FIG. 3 illustrates, as method 100, the operation of secure communication program 82 on computing device 32 for allowing two computers 32(*a*), 32(*b*) to both generate the same key 66 using tokens 54, 62 sharing a secret seed 56. It should be understood that any time a piece of software, such as, for example, secure communication program 82, is described as performing a method, process, step, or function, in actuality what is meant is that a computing device (e.g., computing device 32) on which that piece of software is running performs the method, process, step, or function when executing that piece of software on its processor (e.g., processor 70). It should also be understood that, in some embodiments, instead of processor 70 executing code of secure communication program 82, specialized circuitry of the computing device 32 operates to perform the method, process, step, or function directly in hardware.

In step 110, the computing device (e.g., computer 32(*a*)) engages in a handshake procedure with the other computing device (e.g., computer 32(*b*)) to establish secured communication channel 68 over network 36. In some embodiments, the method 100 is performed from the perspective of first computer 32(*a*), while in other embodiments, the method 100 is performed from the perspective of second computer 32(*b*).

Step 110 may include zero, one, or both of sub-steps 112 and 114.

In sub-step 112, the two computers 32(*a*), 32(*b*) synchronize their clocks 71 in order to establish a clock skew 86 to be stored on one of the two computers 32(*a*), 32(*b*). In one embodiment, first computer 32(*a*) sends its local clock time 84 as server clock time 42 within key identifier hint 40 so that the second computer 32(*b*) is able to calculate and store the clock skew 86 within memory 78 of the second computer 32(*b*) and send a corrected clock time as client clock time 50 within key identifier 48 back to the first computer 32(*a*). Thus, both computers 32 are able to use the time as read by the clock 71 of the first computer 32(*b*).

In another embodiment, key identifier hint 40 does not include server clock time 42, in which case second computer 32(*b*) sends its local clock time 84 as client clock time 50 within key identifier 48 so that the first computer 32(*a*) is able to calculate and store the clock skew 86 within memory 78 of the first computer 32(*a*). Thus, both computers 32 are able to use the time as read by the clock 71 of the second computer 32(*b*).

In another embodiment, neither computer 32 sends its local clock time 84 within either key identifier hint 40 or key identifier 48. In such embodiments, the clocks 71 of both computers are of a high enough quality that there is no need for synchronization.

In some embodiments, the local clock 71 is located within the token 54, 62, in which case the clock skew 86 is applied to the clock time 84 generated by the token 54, 62 rather than the computing device 32.

In sub-step 114, the two computers 32(*a*), 32(*b*) exchange local identifiers 44, 52. Thus, first computer 32(*a*) sends its server ID 44 within key identifier hint 40 and second computer 32(*b*) sends its local clock time 84 as client clock time 50 within key identifier 48. Thus, both computers 32 are able to locally store the same connection ID 88.

In step 120, the computing device 32 generates encryption key 66 using its respective token 54, 62, which stores secret seed 56. Because both computers 32 have a token 54, 62 that stores the same secret seed 56 as well as the same additional information (e.g., a synchronized time yielded from sub-step 112 and/or a connection ID 88 yielded from sub-step 114), both computers 32 are able to generate the same key 66.

In some embodiments, the local token 54, 62 uses its internal clock (possibly offset by the clock skew 86) to generate OTP 60 by cryptographically combining the (corrected) time with the secret seed 56. This OTP 60 may then be displayed on display 58 for the user to type into the computing device 32. Computing device 32 is then able to generate key 66 using the OTP 60 as a seed value according to standard cryptographic algorithms. In some embodiments, computing device 32 uses both the OTP 60 and the connection ID 88 as seed values to generate the key 66.

In other embodiments, the token 54, 62 interfaces directly with the computing device over token interface 74 or as a software program operating directly on the computing device 32, allowing the computing device to generate the key 66 by cryptographically combining (using standard techniques) the secret seed 56 with the (corrected) time, and, in some embodiments also the connection ID 88.

Thus, step 120 may include one or both of sub-steps 122 and 124.

In sub-step 122, the computing device 32 (and/or the token 54, 62) cryptographically combines the secret seed 56 or OTP 60 with the current local clock time 84 (corrected using the local clock skew 86, if any) to generate the key 66.

In sub-step 124, the computing device 32 cryptographically combines the secret seed 56 or OTP 60 with the connection ID 88 to generate the key 66. This allows two computers 32 to communicate securely with each other even though more than two tokens under the control of the same entity may share the same secret seed.

It should be understood that an advantage of using hardware tokens rather than software tokens is that the secret seed 56 may be isolated from the computers 32, preventing a virus or malware attack from scanning for and detecting the secret seed 56. In order to prevent such attacks from succeeding, the hardware token 54, 62 sends the OTP 60 to its respective computer 32 rather than the secret seed 56, whether directly over the token interface 74 or by a user typing OTP 60 displayed on the display 58, 64 into the UI 76.

In step 130, the computing device 32 uses the key 66 to engage in encrypted communications with the other computing device over the secured channel 68.

In some embodiments, the key 66 may be updated periodically for security. In such embodiments, steps 140-160 may be performed as well.

In step 140, the computing device 32 sets the update period 90 after which the key 66 is updated. In some embodiments, the update period 90 is a pre-configured value embedded within the memory of the computing device 32. In other embodiments, the update period 90 is established every time a secured channel 68 is initially set up based on factors that affect the need for security. For example, the computing device 32 may calculate how long an attacker having certain equipment would be expected to take in order to crack the key 66 and then set the update period 90 to be less than that time. In some embodiments, the update period 90 may be set to be much less than the time in which an attacker would be expected to crack the key 66. In some embodiments, the computing device 32 may dynamically select a factor by which to divide the time in which an attacker would be expected to crack the key 66 based on a level of sensitivity of the communications between the computers 32.

In step 150, the computing device 32 generates a revised encryption key after the update period 90 has elapsed, and in step 160, the computing device 32 replaces the key 66 with the revised key in order to communicate over secured channel 68. Since both computing devices 32(*a*), 32(*b*) have the same update period 90 and synchronized clocks 71, both are able to properly revise the key 66 at the same interval yielding the same revised key. Steps 150-160 may be repeated continuously every update interval 90 for as long as secured channel 68 remains open.

Thus, techniques have been described for allowing two computers 32(*a*), 32(*b*) to both generate the same key 66 using tokens 54, 62 sharing a secret seed 56.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a first computing device, the method comprising:
  engaging in a handshake procedure with a remote second computing device to establish a secure channel;
  generating a first encryption key using a first token having a secret seed, the first encryption key being the same as a second encryption key generated by the second computing device using a second token having the same secret seed; and
  using the first encryption key to engage in encrypted communications with the second computing device,
  wherein:
    generating the first encryption key using the first token includes cryptographically combining the secret seed with a current time value;
    engaging in the handshake procedure includes:
      receiving a remote clock value within a handshake message from the second computing device, the remote clock value indicating a current clock value of a clock device in the possession of the second computing device;
      obtaining the current time value from a local clock device in the possession of the first computing device; and
      calculating a clock skew between the remote clock value and the current time value; and
    cryptographically combining the secret seed with the current time value includes offsetting the current time value by the clock skew.

2. The method of claim 1 wherein the method further comprises:
  generating a revised encryption key after a period of time by cryptographically combining the secret seed with a time value indicative of passage of the period of time; and
  after generating the revised encryption key, using the revised encryption key instead of the first encryption key to engage in encrypted communications with the second computing device.

3. The method of claim 2 wherein the period of time is a fixed interval.

4. The method of claim 2 wherein the method further includes:
  estimating an average amount of time it would take an attacker to guess the first encryption key using a key cracking procedure; and
  setting the period of time to be less than the estimated average amount of time.

5. The method of claim 2 wherein the method further includes:
  estimating an average amount of time it would take an attacker to guess the first encryption key using a key cracking procedure; and
  setting the period of time to be an order of magnitude less than the estimated average amount of time.

6. The method of claim 2 wherein the method further includes:

estimating an average amount of time it would take an attacker to guess the first encryption key using a key cracking procedure; and
setting the period of time to be a factor less than the estimated average amount of time, a magnitude of the factor depending on a degree of sensitivity of the secure channel.

7. The method of claim 1 wherein
  the handshake message from the second computing device is a Transport Layer Security (TLS) ServerKeyExchange message; and
  receiving the remote clock value within the handshake message from the second computing device includes receiving the remote clock value within a key identity hint field of the TLS ServerKeyExchange message.

8. The method of claim 1 wherein both the first token and the second token are hardware tokens.

9. The method of claim 8 wherein the method further comprises, prior to engaging in the handshake procedure:
  determining, by a central authority, that there is a need for the first computing device and the second computing device to securely communicate with each other; and
  in response to determining, pre-provisioning, by the central authority, the first hardware token to the first computing device and the second hardware token to the second computing device.

10. The method of claim 1 wherein receiving the remote clock value within the handshake message from the second computing device includes receiving the remote clock value within a key identity hint field of the handshake message.

11. The method of claim 10 wherein the handshake message from the second computing device is a Transport Layer Security (TLS) ServerKeyExchange message.

12. A system comprising:
  a first computing device;
  a second computing device;
  a network connecting the first computing device and the second computing device;
  a first token device assigned to the first computing device, the first token device being programmed with a secret seed; and
  a second token device assigned to the second computing device, the second token device being programmed with the same secret seed as the first token device;
  wherein the first computing device is configured to:
    engage in a handshake procedure with the second computing device to establish a secure channel;
    generate a first encryption key using the first token device, the first encryption key being the same as a second encryption key generated by the second computing device using the second token; and
    use the first encryption key to engage in encrypted communications with the second computing device over the network;
  wherein:
    generating the first encryption key using the first token includes cryptographically combining the secret seed with a current time value;
    engaging in the handshake procedure includes:
      obtaining the current time value from a local clock device in the possession of the first computing device; and
      sending the current time value within a handshake message to the second computing device for the second computing device to use in correcting a remote clock value indicating a current clock value of a clock device in the possession of the second computing device, wherein sending the current time value within the handshake message to the second computing device includes embedding the current time value within a key identity field of the handshake message.

13. The system of claim 12 wherein the secret seed is shared only by the first token device and the second token device, the secret seed not being shared by any other token device.

14. The system of claim 12 wherein:
the secret seed is shared by a third token device in addition the first token device and the second token device; and
engaging in the handshake procedure with the second computing device to establish the secure channel further includes:
sending a first unique identifier of the first computing device to the second computing device; and
receiving a second unique identifier of the second computer from the second computer; and
generating the first encryption key using the first token device further includes cryptographically combining the secret seed with both the first unique identifier and the second unique identifier.

15. The system of claim 12 wherein the handshake message sent to the second computing device is a Transport Layer Security (TLS) ClientKeyExchange message.

16. An apparatus comprising:
a clock;
a network interface for communicating with a remote computing device over a network;
a processor; and
memory, the memory storing a set of instructions which, when executed by the processor, cause the apparatus to perform the operations of:
engaging in a handshake procedure with the remote computing device to establish a secure channel;
generating a first encryption key using a first token having a secret seed, the first token being under the control of the apparatus, the first encryption key being the same as a second encryption key generated by the remote computing device using a second token having the same secret seed, the second token under the control of the remote computing apparatus; and
using the first encryption key to engage in encrypted communications with the remote computing device;
wherein:
generating the first encryption key using the first token includes cryptographically combining the secret seed with a current time value;
engaging in the handshake procedure includes:
receiving a remote clock value within a handshake message from the remote computing device, the remote clock value indicating a current clock value of a clock device in the possession of the remote computing device;
obtaining the current time value from the clock; and
calculating a clock skew between the remote clock value and the current time value; and
cryptographically combining the secret seed with the current time value includes offsetting the current time value by the clock skew.

17. The apparatus of claim 16 wherein receiving the remote clock value within the handshake message from the remote computing device includes receiving the remote clock value within a key identity hint field of the handshake message.

18. The apparatus of claim 17 wherein the handshake message from the remote computing device is a Transport Layer Security (TLS) ServerKeyExchange message.

* * * * *